(12) United States Patent
Lord

(10) Patent No.: US 11,316,593 B2
(45) Date of Patent: Apr. 26, 2022

(54) OPTICAL DWDM DATA AND QKD TRANSMISSION SYSTEM

(71) Applicant: British Telecommunications Public Limited Company, London (GB)

(72) Inventor: Andrew Lord, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 15/733,354

(22) PCT Filed: Dec. 13, 2018

(86) PCT No.: PCT/EP2018/084833
§ 371 (c)(1),
(2) Date: Jul. 8, 2020

(87) PCT Pub. No.: WO2019/137734
PCT Pub. Date: Jul. 18, 2019

(65) Prior Publication Data
US 2020/0350995 A1    Nov. 5, 2020

(30) Foreign Application Priority Data

Jan. 9, 2018   (EP) .................................... 18150872

(51) Int. Cl.
*H04B 10/70* (2013.01)
*H04B 10/50* (2013.01)
(Continued)

(52) U.S. Cl.
CPC ............. *H04B 10/70* (2013.01); *H04B 10/50* (2013.01); *H04B 10/66* (2013.01); *H04J 14/02* (2013.01);
(Continued)

(58) Field of Classification Search
CPC ......... H04B 10/50; H04B 10/66; H04B 10/70
See application file for complete search history.

(56) References Cited

U.S. PATENT DOCUMENTS

| 5,762,788 A | 6/1998 | Gullett |
| 5,896,211 A | 4/1999 | Watanabe |

(Continued)

FOREIGN PATENT DOCUMENTS

| CN | 101292455 A | 10/2008 |
| CN | 103929251 A | 7/2014 |

(Continued)

OTHER PUBLICATIONS

T. E. Chapuran et al.; Compatibility of quantum key distribution with optical networking; Proceedings vol. 5815, Quantum Information and Computation III; May 25, 2005; https://doi.org/10.1117/12.603640 (Year: 2005).*

(Continued)

*Primary Examiner* — Nathan M Cors
(74) *Attorney, Agent, or Firm* — Patterson Thuente Pedersen, P.A.

(57) ABSTRACT

An optical data transmission system and method for, at an optical transmitter, converting to a second wavelength, an optical data signal at a first wavelength; transmitting at the second wavelength, the optical data signal to an optical receiver over an optical path; and transmitting at the first wavelength, to the receiver over the path a single-photon signal comprising a stream of single photons. The optical path is configured to carry optical signals at different wavelengths and the optical path attenuates signals at the first wavelength less than the optical path attenuates signals at the second wavelength. The optical data transmission system and method for, at the receiver, receiving the single-photon signal at the first wavelength and receiving the (Continued)

Transmitter:

optical data signal at the second wavelength; and converting the optical data signal to the first wavelength for detection.

7 Claims, 3 Drawing Sheets

(51) Int. Cl.
*H04B 10/66* (2013.01)
*H04J 14/02* (2006.01)
*H04L 9/08* (2006.01)
*H04B 10/297* (2013.01)

(52) U.S. Cl.
CPC .......... *H04L 9/0819* (2013.01); *H04B 10/297* (2013.01)

(56) References Cited

U.S. PATENT DOCUMENTS

| | | | |
|---|---|---|---|
| 6,233,077 B1 | 5/2001 | Alexander et al. | |
| 6,542,268 B1 | 4/2003 | Rotolo et al. | |
| 6,574,386 B1 | 6/2003 | Sufleta | |
| 6,661,973 B1 | 12/2003 | Huber et al. | |
| 6,792,208 B1 | 9/2004 | Mukherjee et al. | |
| 7,248,695 B1 | 7/2007 | Beal et al. | |
| 7,656,535 B2 | 2/2010 | Healey et al. | |
| 7,667,849 B2 | 2/2010 | Sikora et al. | |
| 7,697,795 B2 | 4/2010 | Heatley et al. | |
| 7,755,971 B2 | 7/2010 | Heatley et al. | |
| 7,796,896 B2 | 9/2010 | Sikora et al. | |
| 7,817,279 B2 | 10/2010 | Healey | |
| 7,848,645 B2 | 12/2010 | Healey et al. | |
| 7,961,331 B2 | 6/2011 | Healey | |
| 7,974,182 B2 | 7/2011 | Healey et al. | |
| 7,995,197 B2 | 8/2011 | Sikora et al. | |
| 8,000,609 B2 | 8/2011 | Healey et al. | |
| 8,003,932 B2 | 8/2011 | Sikora et al. | |
| 8,027,584 B2 | 9/2011 | Healey | |
| 8,045,174 B2 | 10/2011 | Sikora et al. | |
| 8,396,360 B2 | 3/2013 | Healey et al. | |
| 8,538,260 B2 | 9/2013 | Niven-Jenkins et al. | |
| 8,670,662 B2 | 3/2014 | Healey et al. | |
| 9,271,058 B2 | 2/2016 | Lord | |
| 9,560,429 B2 | 1/2017 | Lord | |
| 9,654,248 B2 | 5/2017 | Wright et al. | |
| 9,693,123 B2 | 6/2017 | Lord | |
| 9,860,012 B2 | 1/2018 | Wright et al. | |
| 2002/0054407 A1 | 5/2002 | Yamada et al. | |
| 2002/0159678 A1 | 10/2002 | Derventzis et al. | |
| 2003/0138252 A1 | 7/2003 | Paiam et al. | |
| 2003/0163555 A1 | 8/2003 | Battou et al. | |
| 2003/0202770 A1* | 10/2003 | Garito .................. | G02B 6/1221 385/141 |
| 2007/0076884 A1 | 4/2007 | Wellbrock et al. | |
| 2007/0133798 A1 | 6/2007 | Elliott | |
| 2007/0147841 A1 | 6/2007 | Takita et al. | |
| 2007/0212063 A1 | 9/2007 | Meli et al. | |
| 2008/0137858 A1* | 6/2008 | Gelfond ................ | H04L 9/0852 380/256 |
| 2009/0047019 A1 | 2/2009 | Palacharla et al. | |
| 2009/0226168 A1 | 9/2009 | Boduch | |
| 2009/0232497 A1 | 9/2009 | Archambault et al. | |
| 2011/0110662 A1 | 5/2011 | Wellbrock et al. | |
| 2011/0164876 A1 | 7/2011 | Fujita et al. | |
| 2011/0217038 A1 | 9/2011 | Zhang et al. | |
| 2011/0262142 A1 | 10/2011 | Archambault | |
| 2012/0020664 A1 | 1/2012 | Sakurai et al. | |
| 2012/0087661 A1 | 4/2012 | Look | |
| 2012/0177201 A1* | 7/2012 | Ayling .................. | H04L 9/0858 380/278 |
| 2012/0195428 A1 | 8/2012 | Wellbrock et al. | |
| 2012/0301141 A1 | 11/2012 | Sakamoto et al. | |
| 2013/0045006 A1 | 2/2013 | Dahan et al. | |
| 2013/0142510 A1 | 6/2013 | Zhou | |
| 2014/0140695 A1 | 5/2014 | Lord | |
| 2014/0193148 A1 | 7/2014 | Dahlfort et al. | |
| 2014/0341575 A1 | 11/2014 | Choi et al. | |
| 2015/0249537 A1 | 9/2015 | Wabnig et al. | |
| 2015/0326955 A1 | 11/2015 | Lord et al. | |
| 2016/0013864 A1 | 1/2016 | Rafel Porti et al. | |
| 2016/0057515 A1 | 2/2016 | Lord | |
| 2016/0072608 A1 | 3/2016 | Wright et al. | |
| 2016/0241353 A1 | 8/2016 | Wright et al. | |
| 2019/0109651 A1* | 4/2019 | Su ........................ | H04B 10/506 |
| 2019/0146306 A1* | 5/2019 | Mori ..................... | G02F 1/3536 359/326 |
| 2020/0252136 A1 | 8/2020 | Lord | |

FOREIGN PATENT DOCUMENTS

| | | |
|---|---|---|
| CN | 104092538 A | 10/2014 |
| CN | 107465502 A | 12/2017 |
| EP | 0801452 A2 | 10/1997 |
| EP | 0812078 A2 | 12/1997 |
| EP | 1199905 A2 | 4/2002 |
| EP | 1774695 A2 | 4/2007 |
| EP | 2266250 A1 | 12/2010 |
| EP | 2485429 A2 | 8/2012 |
| EP | 2680606 A1 | 1/2014 |
| GB | 2514134 A | 11/2014 |
| GB | 2514134 B | 5/2016 |
| GB | 2534917 A | 8/2016 |
| WO | WO-2006014298 A2 | 2/2006 |
| WO | WO-2009112286 A1 | 9/2009 |
| WO | WO-2010048901 A1 | 5/2010 |
| WO | WO-2011039503 A2 | 4/2011 |
| WO | WO-2014060793 A1 | 4/2014 |
| WO | WO-2015048783 A1 | 4/2015 |
| WO | WO-2017030532 A1 | 2/2017 |
| WO | WO-2018060530 A1 | 4/2018 |
| WO | WO-2018141681 A1 | 8/2018 |
| WO | WO-2019016263 A1 | 1/2019 |

OTHER PUBLICATIONS

Aleksic S., et al., "Impairment Evaluation toward QKD Integration in a Conventional 20-Channel Metro Network," Optical Society of America, Mar. 22-26, 2015, 3 pages.

Aleksic S., et al., "Towards a Smooth Integration of Quantum Key Distribution in Metro Networks," Proceedings of the 16th International Conference on Transparent Optical Networks, Jul. 6-10, 2014, pp. 1-4.

Application and File History for U.S. Appl. No. 14/780,932, filed Sep. 28, 2015, Inventors: Lord.

Application and File History for U.S. Appl. No. 14/409,745, filed Dec. 19, 2014, Inventors: Lord et al, 157 pages.

Application and File History for U.S. Appl. No. 14/780,948, filed Sep. 28, 2015, Inventors: Lord, 262 pages.

Application and File History for U.S. Appl. No. 14/780,959, filed Sep. 28, 2015, Inventors: Lord, 240 pages.

Borella M.S., et al., "Optical Components for WDM Lightwave Networks," Proceedings of the IEEE, Aug. 1, 1997, vol. 85 (8), 35 Pages.

Chapuran T.E., et al., "Optical Networking for Quantum Key Distribution and Quantum Communications," New Journal of Physics, vol. 11, Oct. 7, 2009, pp. 1-19.

Combined Search and Examination Report under Sections 17 and 18(3) for Great Britain Application No. 1704178.1, dated Sep. 14, 2017, 6 pages.

Combined Search and Examination Report under Sections 17 and 18(3) dated Jun. 28, 2018 for Great Britain Application No. 1800333. 5, 5 pages.

Extended European Search Report for Application No. 17161330.0, dated Aug. 30, 2017, 10 pages.

Extended European Search Report for Application No. 18150872.2, dated Jul. 3, 2018, 10 pages.

Extended European Search Report for Application No. EP12250127. 3, dated Dec. 17, 2012, 7 pages.

(56) References Cited

OTHER PUBLICATIONS

First Office Action dated Jun. 2, 2020 for Chinese Application No. 201880018103.7, 17 pages.
Frisken S., et al., "Wavelength-Selective Reconfiguration in Transparent Agile Optical Networks", Proceedings of the IEEE, May 2012, vol. 100 (5), 9 pages.
Gringeri S., et al., "Flexible Architectures for Optical Transport Nodes and Networks," IEEE Communications Magazine, IEEE Service Center, Piscataway, US, Jul. 1, 2010, vol. 48 (7), pp. 40-50.
International Preliminary Report on Patentability for Application No. PCT/EP2018/055948, dated Sep. 26, 2019, 9 pages.
International Preliminary Report on Patentability for Application No. PCT/EP2018/074887, dated Apr. 2, 2020, 9 pages.
International Preliminary Report on Patentability for Application No. PCT/EP2018/084833, dated Jul. 23, 2020, 9 pages.
International Search Report and Written Opinion for Application No. PCT/EP2018/055948, dated Jun. 8, 2018, 11 pages.
International Search Report and Written Opinion for Application No. PCT/EP2018/084833, dated Jan. 28, 2020, 12 pages.
International Search Report and Written Opinion for Application No. PCT/EP2018/074887, dated Oct. 25, 2018, 11 pages.
International Search Report for Application No. PCT/GB2013/000209, dated Jun. 17, 2013, 3 pages.
International Search Report for Application No. PCT/GB2014/000090, dated Jun. 16, 2014, 2 pages.
International Search Report for Application No. PCT/GB2014/000091, dated Jul. 2, 2014, 3 pages.
International Search Report for Application No. PCT/GB2014/000092, dated Jul. 2, 2014, 3 pages.
Jansen S.L., "Optical Phase Conjugation in Fiber-Optic Transmission Systems," Jan. 1, 2006, Retrieved from https://doi.org/10.6100/IR610247, 172 pages.

Nweke N.I., et al., "EDFA bypass and filtering architecture enabling QKD+WDM coexistence on mid-span amplified links," Technical Digest CD-ROM/conference on Lasers and ElectroOptics, Quantum Electronics and Laser Science Conference, Conference On Photonic Applications, Systems and Technologies, May 21, 2006, 2 pages.
Rohde H., et al., "Quantum Key Distribution Integrated into Commercial WDM Systems," IEEE, Fiber Optics Communications, Quantum Communications, Feb. 24, 2008, 3 pages.
Taylor., "Trends in Dynamic Optical Networks," Nov. 5, 2007, 8 pages.
Wang L., et al., "OSPF Extensions for Routing Constraint Encoding in Flexible-Grid Networks," IETF Network Working Group, China Academy of Telecom Research, MIIT, Internet Draft, Jul. 16, 2012, 24 pages.
Application and Filing Receipt for U.S. Appl. No. 16/494,564, filed Sep. 16, 2019, Parkin.
Alshowkan M., et al., "Quantum Entanglement Distribution for Secret Key Establishment in Metropolitan Optical Networks," 2016 IEEE International Conference on Networking, Architecture and Storage (NAS), Aug. 8-10, 2016, pp. 1-8.
Cheng N., et al., "Large Splitting and Long Reach Passive Optical Networks With Mode Coupling Receivers," 36th European Conference and Exhibition on Optical Communication, Sep. 19-23, 2010, pp. 1-3.
Ciurana A., et al., "Entanglement Distribution in Optical Networks," IEEE Journal of Selected Topics in Quantum Electronics, vol. 21 (3), May-Jun. 2015, pp. 1-12.
Nesset D., et al., "GPON SFP Transceiver With PIC Based Mode-Coupled Receiver," 2012 38th European Conference and Exhibition on Optical Communications, Sep. 16, 2012, pp. 1-3.
Runser R J., et al., "Demonstration of 1.3 µm Quantum Key Distribution (QKD) Compatibility with 1.5 µm Metropolitan Wavelength Division Multiplexed (WDM) Systems," Fiber Optics Communications, Quantum Detectors, vol. 3, Mar. 6, 2005, 3 pages.

* cited by examiner

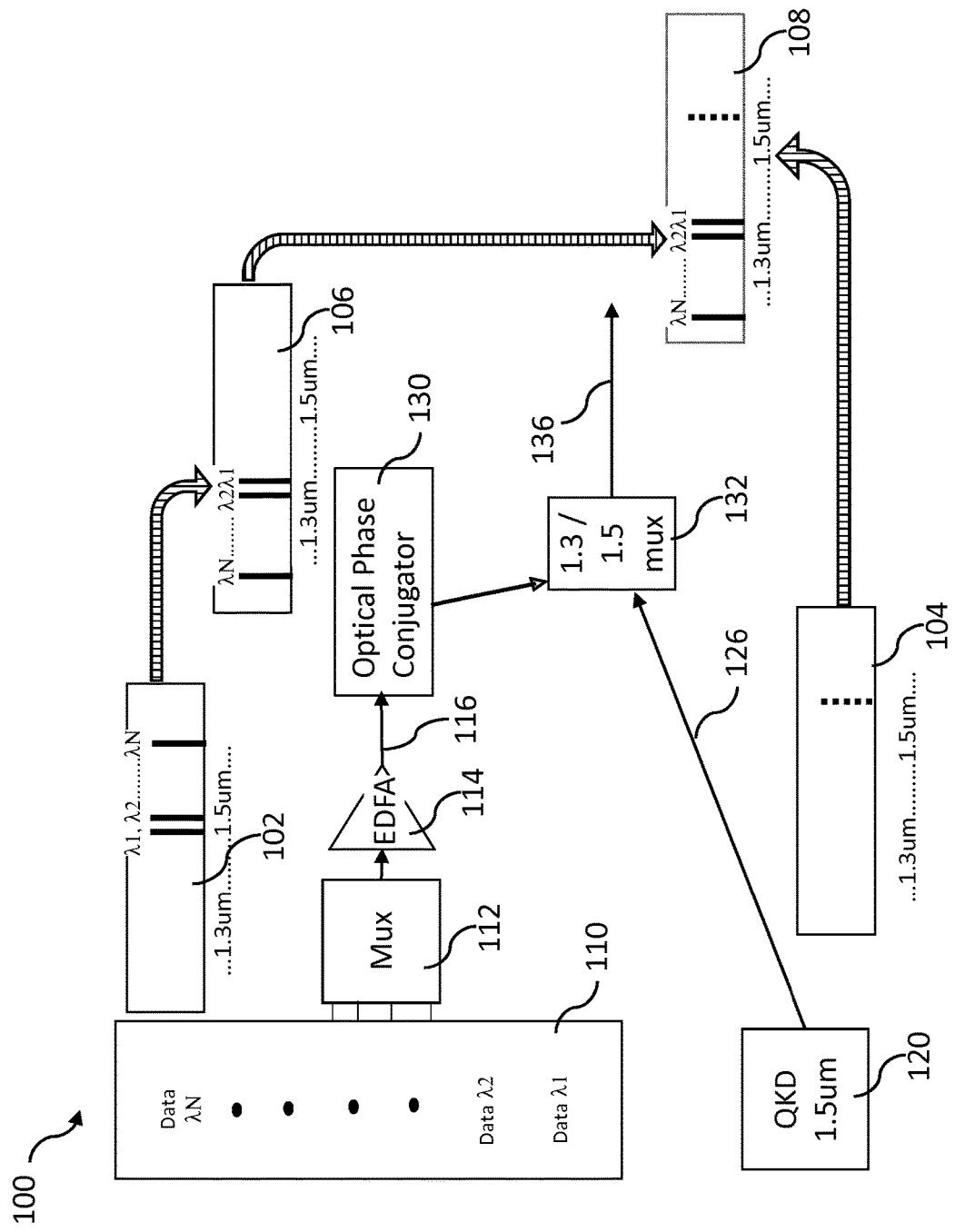
Figure 1. Transmitter:

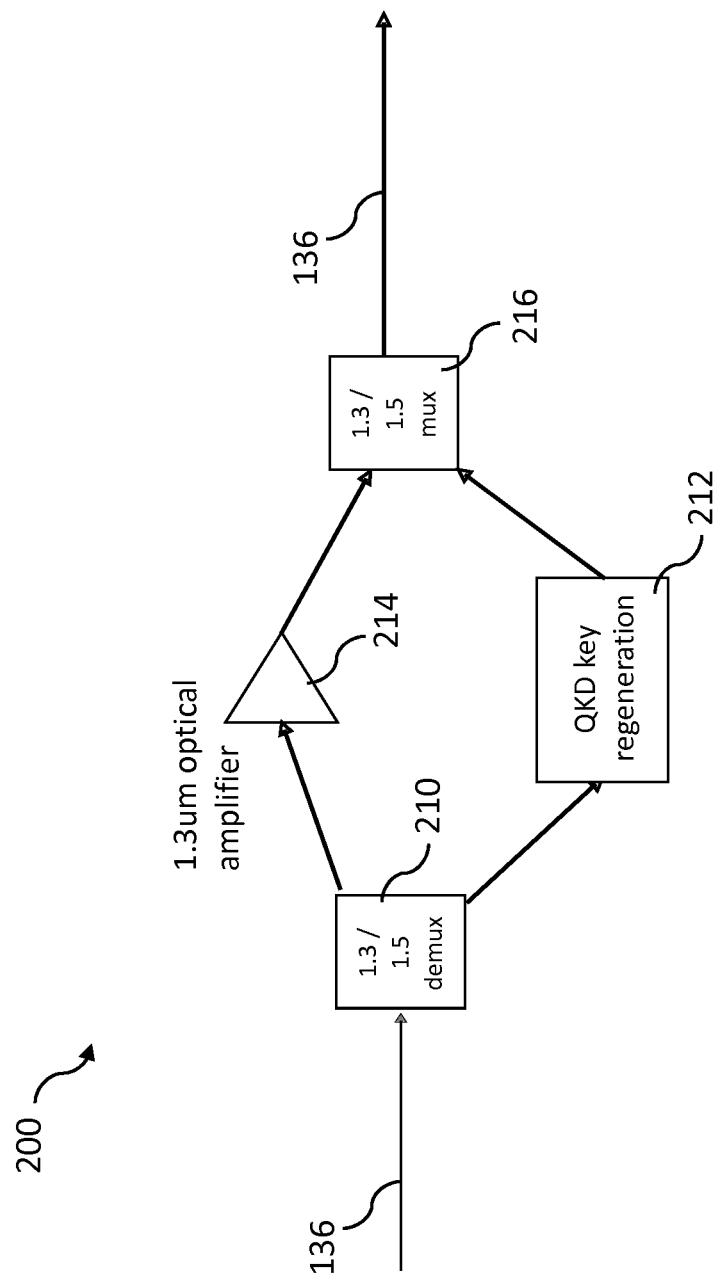
Figure 2. Repeater

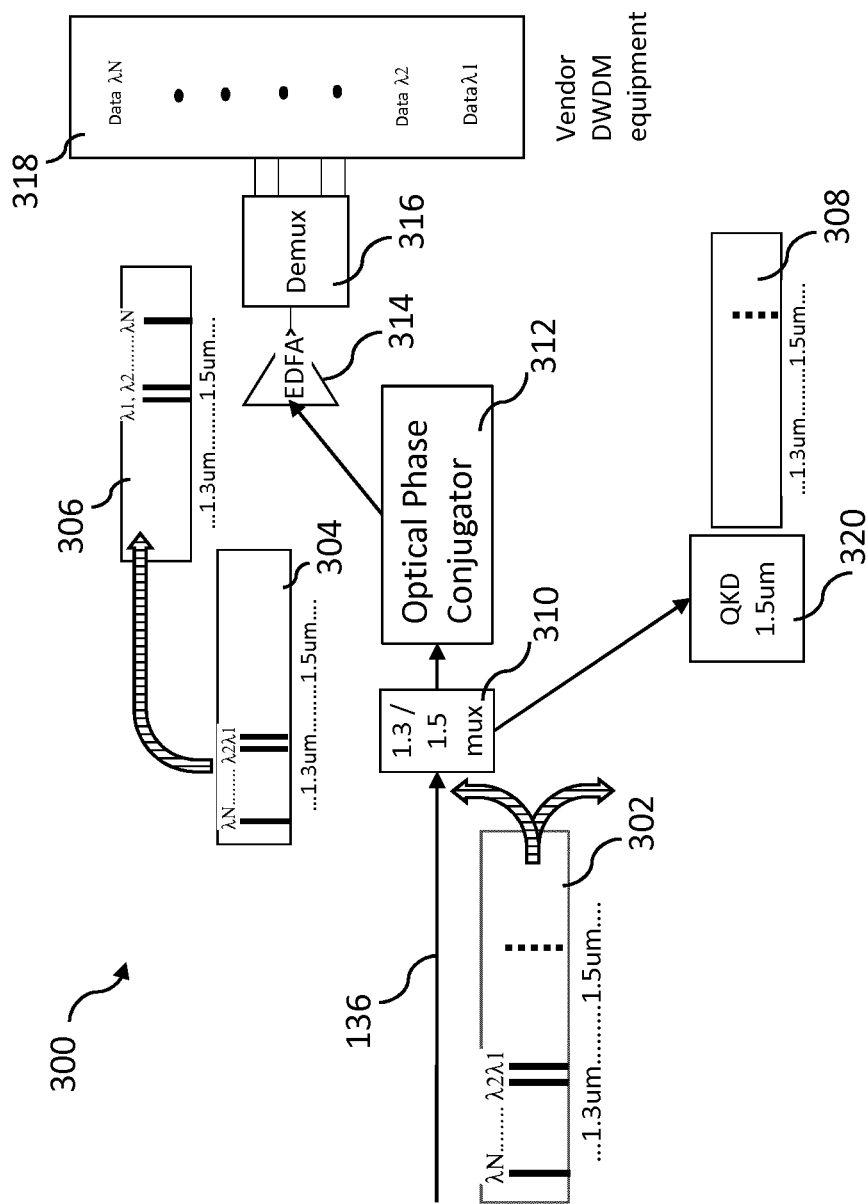
Figure 3. Receiver

OPTICAL DWDM DATA AND QKD TRANSMISSION SYSTEM

PRIORITY CLAIM

The present application is a National Phase entry of PCT Application No. PCT/EP2018/084833, filed Dec. 13, 2018, which claims priority from EP Patent Application No. 18150872.2, filed Jan. 9, 2018, each of which is hereby fully incorporated herein by reference.

TECHNICAL FIELD

The present disclosure relates to optical communication in general and to the communication of a single-photon (e.g. QKD) signal.

BACKGROUND

Secure transmission of data over an optical fiber may be achieved by using one or more encryption keys to encrypt data and then transporting the key and the encrypted data between the same end-points. The data transport can be via an entirely different path and even over a different transmission medium to the key. However, it is often advantageous for the data transmission to take place over the same optical fiber as the key transmission. Different optical wavelengths will experience different levels of attenuation over commercially-available optical fibers with the transmission of data conventionally taking advantage of wavelengths that experience the lowest-attenuation.

Quantum-key distribution (QKD) uses quantum principles to establish a completely secure method of transporting keys. The technique relies on modulating single photons and then transporting them over an optical fiber. Attenuation experienced during transmission of QKD streams over an optical fiber reduces the number of photons reaching the receiver. The rate at which photons are received determines the eventual key rate and, if attenuation is too high, QKD may become unworkable.

Data transmission over optical fiber generally makes use of the 1.5 um optical wavelength band because of the lower loss and vendors of optical communication equipment widely produce equipment for data transmission at 1.5 um. For example, optical amplifiers for 1.5 um wavelengths (known as Erbium doped fiber amplifiers (EDFAs)) are widely available. Data can be sent simultaneously over multiple wavelengths on an optical fiber, all in the 1.5 um optical wavelength band and this is known as Dense Wavelength Division Multiplexing (DWDM).

A conventional solution for transmitting QKD keys and data on the same fiber is to transport the QKD keys over the next-best choice wavelength, i.e. 1.3 um, but the QKD keys are more sensitive to attenuation than the data.

Another solution is to have both QKD keys and data transported at 1.5 um and to deploy advanced techniques to limit interference. These advanced techniques may include significantly reducing the data channel power levels and providing advanced filtering of the QKD channel—for example time filtering in which the receiver is gated to accept photons only in pre-allocated time slots. However, reducing the data channel power levels can result in unreliable transmission, while time filtering has proved difficult to implement in commercial optical networks.

Optical phase conjugation is described in Jansen, S. L. (2006), Optical phase conjugation in fiber-optic transmission systems; Eindhoven: Technische Universiteit Eindhoven DOI: 10.6100/IR610247.

SUMMARY

The present disclosure accordingly provides in a first aspect an optical data transmission system comprising an optical transmitter and an optical receiver connected by an optical path, in which the optical path is configured to carry optical signals at different wavelengths; in which the optical path attenuates signals at a first wavelength less than it attenuates signals at a second wavelength. The transmitter is configured to convert to the second wavelength, an optical data signal at the first wavelength and to transmit, at the second wavelength, the optical data signal to the receiver over the path and the transmitter is configured to transmit to the receiver over the path at the first wavelength, a single-photon signal comprising a stream of single photons. The receiver is configured to receive the single-photon signal at the first wavelength and the optical data signal at the second wavelength and to convert the optical data signal to the first wavelength for detection.

In this way, single-photon signals, such as QKD keys, that are more sensitive to attenuation than data signals, enjoy optimum attenuation characteristics over the optical path. The invention results in increased range and reliability for QKD systems.

The present disclosure accordingly provides in a second aspect a method of optical data transmission comprising, at an optical transmitter: converting to a second wavelength, an optical data signal at a first wavelength; transmitting at the second wavelength, the optical data signal to an optical receiver over an optical path; and transmitting at the first wavelength, to the receiver over the path a single-photon signal comprising a stream of single photons. The optical path is configured to carry optical signals at different wavelengths and the optical path attenuates signals at the first wavelength less than it attenuates signals at the second wavelength. The method further comprises, at the receiver: receiving the single-photon signal at the first wavelength and receiving the optical data signal at the second wavelength; and converting the optical data signal to the first wavelength for detection.

Further details of the disclosure are set out in the appended claims.

BRIEF DESCRIPTION OF THE DRAWINGS

In order that the present disclosure may be better understood, embodiments thereof will now be described, by way of example only, with reference to the accompanying drawings in which:

FIG. 1 shows schematically an exemplary optical transmitter.

FIG. 2 shows schematically an exemplary optical repeater.

FIG. 3 shows schematically an exemplary optical receiver.

DETAILED DESCRIPTION OF EMBODIMENTS

We now describe how Optical Phase Conjugation is used in an embodiment of the disclosure to shift the transmission of data from a low-loss, optical transmission band (often this is the 1.5 um C optical wavelength band) to another optical wavelength band, for example, the L or O optical wavelength band, thus freeing up the C optical wavelength band for QKD transmission that then benefits from the lower loss of the fiber in this optical wavelength band. This can improve transmission distances for QKD signals by approximately 50% compared to existing techniques, while still supporting viable optical data transmission. Advantageously, the technique can be implemented in modified existing commercial optical networks using widely available vendor equipment. In particular, conventional DWDM equipment may be used to generate, in the normal way, data signals that are then wavelength-shifted by use of Optical Phase Conjugation and conventional DWDM equipment may be used to detect, in the normal way, data signals that have experienced two, successive wavelength-shifts by use of Optical Phase Conjugation.

According to an embodiment, a first optical phase conjugator is employed to shift the optical wavelengths used to transport data from 1.5 um to 1.3 um. The data is then transmitted at 1.3 um, freeing up the 1.5 um optical wavelength band for transmission of QKD keys. At the receiver, a second Optical Phase Conjugator OPC is employed to shift the data back to 1.5 um for detection, thereby allowing standard optical communication equipment to be used.

We now describe exemplary embodiments of the disclosure with reference to data signals at 1.5 um shifted to 1.3 um. It will be understood that other wavelengths may be used, depending on the specific application, optical path characteristics, etc. It will be understood that reference here to a signal at a specific optical wavelength extends to any wavelength in the corresponding optical wavelength band. The first optical phase conjugator mixes the optical data signals at 1.5 um with a high power pump signal at a selected wavelength and exploits a special non-linear optical fiber (the OPC fiber) to generate new wavelengths through a nonlinear process (such as Four Wave Mixing). The result is that the data signal wavelengths are translated to a different part of the optical spectrum, vacating the original optical wavelength band. According to an embodiment, an optical filter may be provided to remove from the transmission path any residual data signal at 1.5 um. Another result is that the data signal spectrum is inverted so that higher wavelength components become lower wavelength components and vice versa.

FIG. 1 shows details of an optical transmitter 100, located at one end of optical fiber transmission system 136. A number of spectral windows are included in the Figures to provide approximate indications of the spectrum of optical signals at various points in optical paths. As indicated in spectral window 102 in FIG. 1, conventional DWDM equipment (transponder bank 110 (i.e. a rack of optical transponders), multiplexer 112 and EDFA 114) is used to generate data signals at 1.5 um on optical fiber 116. The data signals in the 1.5 um optical wavelength band are fed into optical phase conjugator 130 that inverts the data spectrum as shown schematically in spectral window 106, moving the data signal from 1.5 um to 1.3 um. According to an embodiment, the conventional DWDM equipment (transponder bank 110 (i.e. a rack of optical transponders), multiplexer 112 and EDFA 114) used to generate data signals at 1.5 um on optical fiber 116 a may be located at a different optical node (not shown). In this case, the data signals at 1.5 um fed into optical phase conjugator 130 are received over a further optical path (not shown) from the different optical node. As shown schematically in spectral window 104 in FIG. 1, conventional QKD equipment 120 is used to generate on optical fiber 126, a QKD signal (shown in broken line) that is also generated at 1.5 um. A 1.3/1.5 um multiplexer 132 combines the shifted (1.3 um) data signals and the original (1.5 um) QKD signal for transmission on optical fiber transmission system 136. The combined shifted data signals at 1.3 um and QKD signal at 1.5 um (broken line) are shown in spectral window 108.

FIG. 2 shows details of an optional repeater 200 that may be located at an intermediate point along optical fiber transmission system 136. As shown schematically in FIG. 2, the QKD signal and data signals are separated at 1.3/1.5 um demultiplexer 210. The QKD signal is sent to trusted node 212 where the signal is regenerated. Regeneration involves detecting the stream of photons received on an input fiber and generating an equivalent stream of photons on an output fiber. The data signals are sent to optical amplifier 214 for amplification. As EDFAs have no gain at 1.3 um, according to an embodiment the optical amplifier 214 uses different technologies that are available, that provide amplification at 1.3 um (for example amplifiers based on different glass dopants, such as Praseodymium Doped Fiber Amplifiers, or Raman amplification). Finally the regenerated and amplified signals are recombined at 1.3/1.5 um multiplexer 216 for onward transmission.

FIG. 3 shows details of an optical receiver 300 that may be located on optical fiber transmission system 136 at the opposite end from transmitter 100. As shown schematically in spectral window 302 in FIG. 3 (compare spectral window 108 in FIG. 1), the combined shifted data signals at 1.3 um and QKD signal at 1.5 um (again shown in broken line) are received at 1.3/1.5 um demultiplexer 310 over optical fiber transmission system 136. 1.3/1.5 um demultiplexer 310 separates the received signals and sends the shifted data signals at 1.3 um (as shown schematically in spectral window 304) to second optical phase conjugator 312 where the data spectrum is inverted for a second time as shown schematically in spectral window 306, moving the data signal from 1.3 um to 1.5 um. Optical phase conjugator 312 passes the newly-inverted data spectrum to conventional DWDM equipment (EDFA 314, demultiplexer 316 and transponder bank 318) used to detect the data signals at 1.5 um. 1.3/1.5 um demultiplexer 310 also sends the QKD signal at 1.5 um to QKD receiver 320, where the single photons are detected. Full QKD system signaling can therefore be implemented between transmit and receive nodes, for example, to share QKD keys.

It will be understood by those skilled in the art that, although the present disclosure has been described in relation to the above described example embodiments, the invention is not limited thereto and that there are many possible variations and modifications which fall within the scope of the invention. The invention is not limited to any particular wavelengths or wavelength bands or to any particular optical medium but has application to any optical medium where loss varies with wavelength.

The invention claimed is:

1. An optical data transmission system comprising:
   an optical transmitter, an optical receiver connected by an optical path, and an optical repeater at an intermediate point along the optical path;
   wherein:
   the optical path is configured to carry optical signals at different wavelengths, and the optical path attenuates signals at a first wavelength less than the optical path attenuates signals at a second wavelength;
   the optical repeater configured to regenerate optical signals at the first wavelength, amplify optical signals at the second wavelength, and recombine the regenerated optical signals and the amplified optical signals;

the optical transmitter is configured to convert an optical data signal at the first wavelength to the second wavelength and to transmit the optical data signal at the second wavelength to the optical receiver over the optical path;

the optical transmitter is configured to transmit a single-photon signal comprising a stream of single photons to the optical receiver over the optical path at the first wavelength; and the optical receiver is configured to receive the single-photon signal at the first wavelength and to receive the optical data signal at the second wavelength and to convert the optical data signal to the first wavelength for detection.

2. The optical data transmission system according to claim 1, wherein the optical receiver comprises optical detectors configured to detect the optical data signal at the first wavelength.

3. The optical data transmission system according to claim 1, wherein the optical receiver is configured to detect the single-photon signal at the first wavelength.

4. The optical data transmission system according to claim 1, wherein the first wavelength is in a wavelength band around 1.5 um and the second wavelength is in a wavelength band around 1.3 um.

5. The optical data transmission system according to claim 1, wherein a wavelength of the optical data signal at the optical transmitter is shifted from the first wavelength to the second wavelength by an Optical Phase Conjugation process.

6. The optical data transmission system according to claim 1, wherein a wavelength of the optical data signal at the optical receiver is shifted from the second wavelength to the first wavelength by an Optical Phase Conjugation process.

7. A method of optical data transmission comprising:

at an optical transmitter:
converting an optical data signal at a first wavelength to a second wavelength;
transmitting the optical data signal at the second wavelength over an optical path and an optical repeater to an optical receiver; and
transmitting a single-photon signal comprising a stream of single photons at the first wavelength over the optical path and the optical repeater to the optical receiver;

wherein the optical path is configured to carry optical signals at different wavelengths, and the optical path attenuates signals at the first wavelength less than the optical path attenuates signals at the second wavelength, wherein the optical repeater is configured to regenerate optical signals at the first wavelength, amplify optical signals at the second wavelength, and recombine the regenerated optical signals and the amplified optical signals;

and wherein the method further comprises, at the optical receiver:
receiving the single-photon signal at the first wavelength and receiving the optical data signal at the second wavelength; and
converting the optical data signal to the first wavelength for detection.

* * * * *